Feb. 16, 1932.  W. A. HUBENER  1,845,275
SPRING TOGGLE
Filed Feb. 7, 1930   2 Sheets-Sheet 1
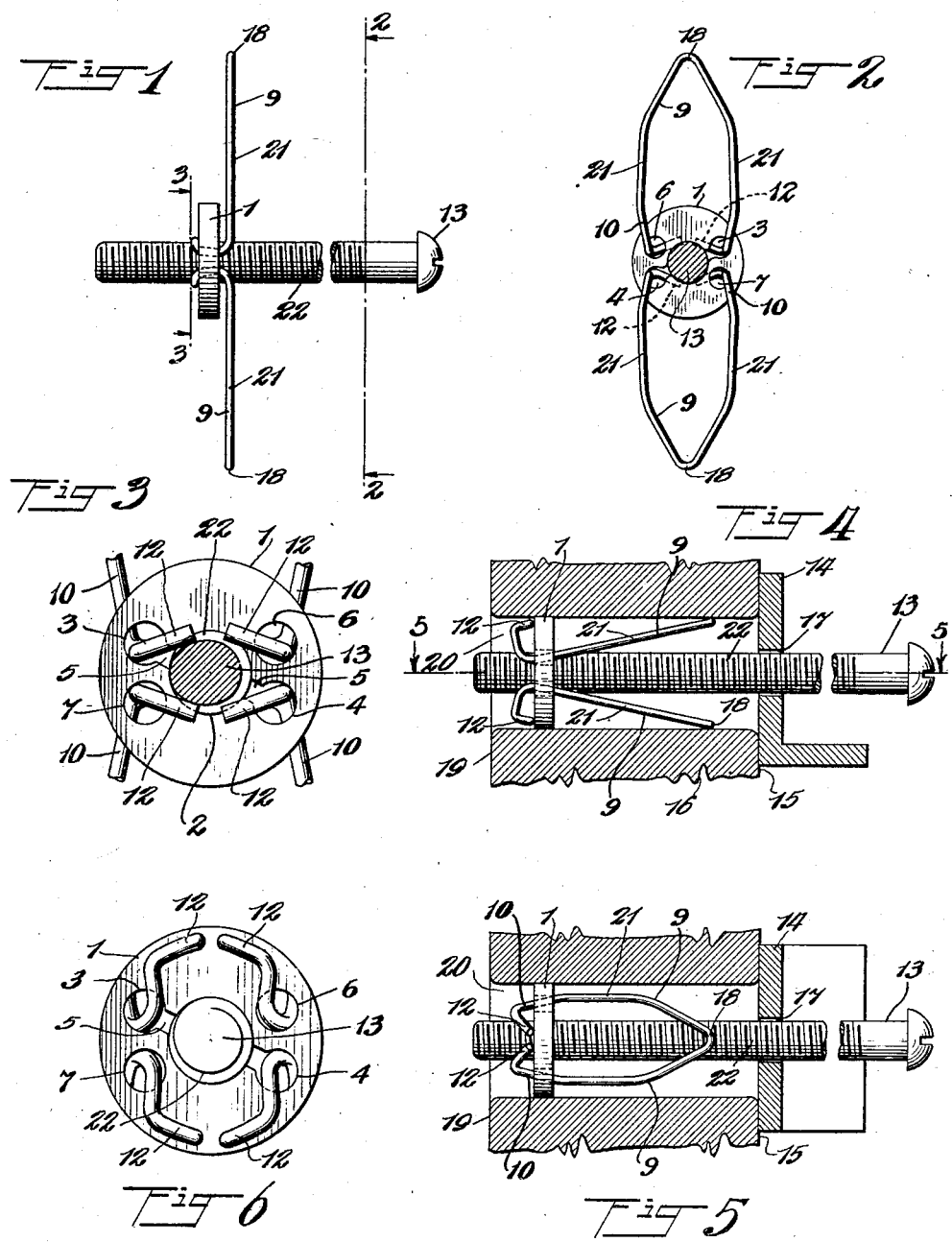

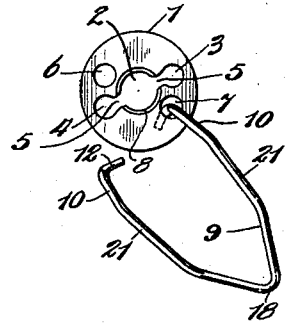
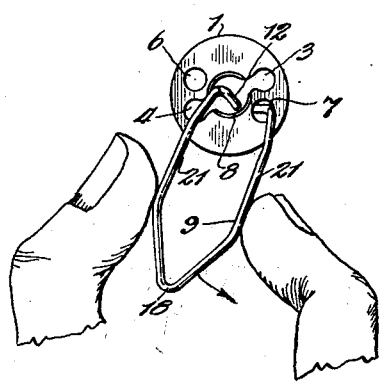
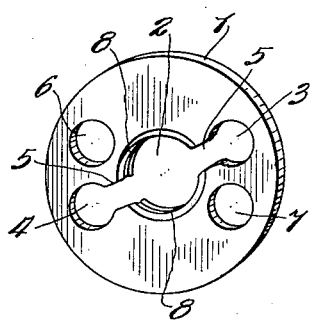
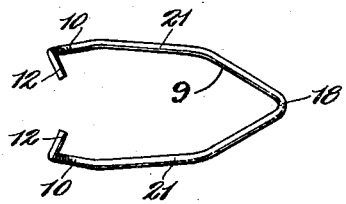
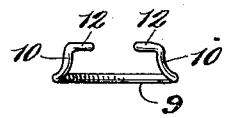
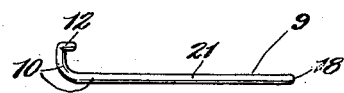

Patented Feb. 16, 1932

1,845,275

UNITED STATES PATENT OFFICE

WILLIAM A. HUBENER, OF NEW YORK, N. Y., ASSIGNOR TO HENRY B. NEWHALL CORPORATION, OF GARWOOD, NEW JERSEY, A CORPORATION OF NEW JERSEY

SPRING TOGGLE

Application filed February 7, 1930. Serial No. 426,598.

My invention relates to a new and improved spring toggle, to secure objects to walls, ceilings, or other supports, where it is impossible, or not feasible, to get behind the support to manually apply a nut, or other fastening member, to the bolt supporting the work.

My invention further relates to certain combinations, sub-combinations, and articles of manufacture as will be more fully hereinafter described and pointed out in the claims.

In the accompanying drawings I have shown an illustrative embodiment of my invention, simply by ways of example, though it is to be distinctly understood that my invention is not to be confined to this particular form. In these drawings the same reference numerals refer to similar parts in the several figures.

Fig. 1 is a side elevation;

Fig. 2 is a sectional view, on line 2, 2 of Fig. 1, looking in the direction of the arrows, the wings and nut being shown in front elevation.

Fig. 3 is a fragmentary vertical section, on line 3, 3 of Fig. 1, on an enlarged scale, the nut and engaging hooks being shown in rear elevation.

Fig. 4 is a vertical section through a support, illustrating the spring toggle being placed in position.

Fig. 5 is a horizontal section, on line 5, 5 of Fig. 4, looking down in the direction of the arrows.

Fig. 6 is a detail rear view of Fig. 4, on an enlarged scale.

Fig. 7 is a detail view of the nut and one of the spring wings, illustrating the first step in applying the wing to the nut or supporting member.

Fig. 8 is a detail view, similar to Fig. 7, showing the next step in applying the wing to the nut or supporting member.

Fig. 9 is a detail perspective view of one form of nut which may be employed.

Fig. 10 is a plan view of one of the spring wings.

Fig. 11 is a rear elevation of the wing of Fig. 10.

Fig. 12 is a side elevation of one of the wings.

My improved spring toggle is of few parts, and can be quickly and easily assembled. No spring, or springs, other than the spring wings themselves, are employed. The wing supporting member, in the form of a nut, is formed of a stamping of ordinary flat metal, properly punched, but requiring no swaging, shaping or other manipulation to form elevations or depressions, or other inclined surfaces, channels, or domes acting as wedge or similar actuating members.

Further, for a spring toggle of a given holding power, it requires a smaller hole than any prior to my invention. This is very important when it is considered that the holes have to be drilled, and that the larger the hole more difficult it is to drill it, and more it defaces the surface of the wall, ceiling or other support.

For example, one size of my spring toggle requires but a ⅝ths inch hole, actual size, and not a hole made with a ⅝ths inch drill which, in practice, makes a hole 11/16ths inch in diameter. This minimum size hole applies to all sizes of my spring toggle, the size given being simply by way of example.

In the particular form of spring toggle, shown by way of example, 1 is a flat stamping formed of sheet metal of the required thickness. At the same time that it is stamped, or subsequently, it is provided with an axial bore 2 Fig. 9, and with open holes 3 and 4 connected with the axial bore 2 by the connecting slots 5, 5. At the same time, or subsequently, the flat stamping 1 is provided with two closed holes 6 and 7. The closed hole 6 is adjacent the open hole 4 but is not, in this form, connected with the axial bore 2. The closed hole 7 is located adjacent the open hole 3 but is not connected with the axial bore 2.

The flat stamping 1 is then tapped to form the female screw threads 8, thereby making the flat stamping the nut 1.

The wings 9 are formed of spring wire bent back on itself, the ends of the wire being bent inward slightly at 10, 10, the very ends being bent inward towards each other at 12, 12. The bent portions 12, 12 form hooks to permit the attaching of the wings to the nut 1.

To secure one of the spring wings 9 to the wing supporting member or nut, one of its hooks is passed through one of the closed holes, as for example 7, Fig. 7. Then the other arm of the spring wing 9 is bent up so as to permit the other hook 12 of the spring wing to be brought above the nut 1, and manipulated until its hook snaps into the axial bore 2, Fig. 8. It is then moved slightly, in the direction of the arrow, Fig. 8, until the hook 12 snaps into the open hole 4 through the slot 5, so that one hook of the spring wing is located in one closed hole, 7, and one open hole, 4. The other wing 9 is mounted in the closed hole 6 and the open hole 3 in a similar manner. The ends of the different hooks will then be located on the rear of the wing supporting member or nut 1, Figs. 1, 3, 4, 5 and 6.

To support the work, as for example a bracket 14, on the face 15 of the wall or other suitable support 16, the bolt 13 is passed through the hole 17 in the bracket and then screwed into the nut 1. Fig. 1 shows this position of the parts, with the exception of the bracket.

The fingers of the operator are then employed to press down on the two wings 9, 9 and rock them toward each other and adjacent the bolt 13. In pressing the wings down the bent portions 10, 10 of each spring wing are caused to move within the respective holes 7, 4 and 6, 3 slightly to the rear. This causes the sides 21, 21 of the spring wings to approach each other due to the action of the incline of bent portions 10, 10 of each wing co-operating with the holes. When the two sides 21, 21 of the spring wing are brought towards each other in this manner they are put under tension. In practice this tension continues until the ends 18, 18 of the wings pass the interior and usually inaccessible surface 19 of the wall or support 16.

The moment that these ends 18, 18 are released from the hole 20, the tension in the wings will cause them to spring out into their extended position, Fig. 1, permitting the bolt 13 to be screwed home in the wing supporting member or nut 1 and firmly support the work 14 on the support 16. At the same time that the wings 9, 9 fly out into their normal position the hooks on each wing separate, due to the side members 21, 21 assuming their normal position, and severally engage with, and lock the male screw threads 22 on the bolt 13, see dotted lines in Fig. 2 and in full lines in Fig. 3. It is, therefore, clear that the harder the bolt 13 is screwed home the harder the ends or hooks 12, 12 will engage with the male threads 22 of the bolt 13 and form locks, which will prevent the bolt 13 working loose in the nut 1, due to vibration of the work 14 or from other cause. This insures that the work will always be held firmly against the surface 15 of the support 16.

Having thus described this invention in connection with an illustrative embodiment thereof, to the details of which I do not desire to be limited, what is claimed as new and what is desired to secure by Letters Patent is set forth in the appended claims.

What I claim is:—

1. The combination in a toggle bolt of a wing supporting member, wings carried by the member, a bolt, and means to lock the member in its adjusted position on the bolt.

2. The combination in a toggle of a wing supporting member, wings carried by the member, a bolt, a lock carried by the wing engaging said bolt.

3. The combination in a toggle of a wing supporting member, wings carried by the member, a bolt and a lock actuated by the wings.

4. The combination in a toggle, of a nut, wings carried by the nut, a lock forming a part of each wing, and a bolt with which the locks carried by the wings co-operate.

5. The combination in a spring toggle, of a nut, a plurality of spring wings each provided with locking means carried by the nut, and a bolt the screw threads of which are adapted to be locked by the said locking means.

6. A new article of manufacture comprising a spring toggle formed of integral spring wings adapted to directly contact with the rear surface of a wall or other support, a supporting member for said spring wings provided with means to co-operate with a bolt, and a bolt, said integral spring wings being provided with means to cooperate with and lock the bolt in any adjusted position.

7. A new article of manufacture comprising a flat wing supporting member stamped from sheet metal and provided with an axial bore having screw threads and with two opposed open holes connected with the axial bore by slots, and provided with two additional closed opposed holes not connected with the axial bore, to permit the two ends of a spring wing to engage one end in an open hole and the other end in a closed hole.

WILLIAM A. HUBENER.